J. H. B. REA.
Fertilizer-Distributer.

No. 208,848.  Patented Oct. 8, 1878.

WITNESSES  
Robert Everitt  
James J. Stuhy

INVENTOR,  
John H. B. Rea.  
By Gilmore, Smith & Co.  
ATTORNEYS.

UNITED STATES PATENT OFFICE.

JOHN H. B. REA, OF TRION FACTORY, GEORGIA.

IMPROVEMENT IN FERTILIZER-DISTRIBUTERS.

Specification forming part of Letters Patent No. 208,848, dated October 8, 1878; application filed July 27, 1878.

*To all whom it may concern:*

Be it known that I, JOHN H. B. REA, of Trion Factory, in the county of Chattooga and State of Georgia, have invented a new and valuable Improvement in Fertilizer-Sowers; and I do hereby declare that the following is a full, clear, and exact description of the construction and operation of the same, reference being had to the annexed drawings, making a part of this specification, and to the letters and figures of reference marked thereon.

Figure 1:
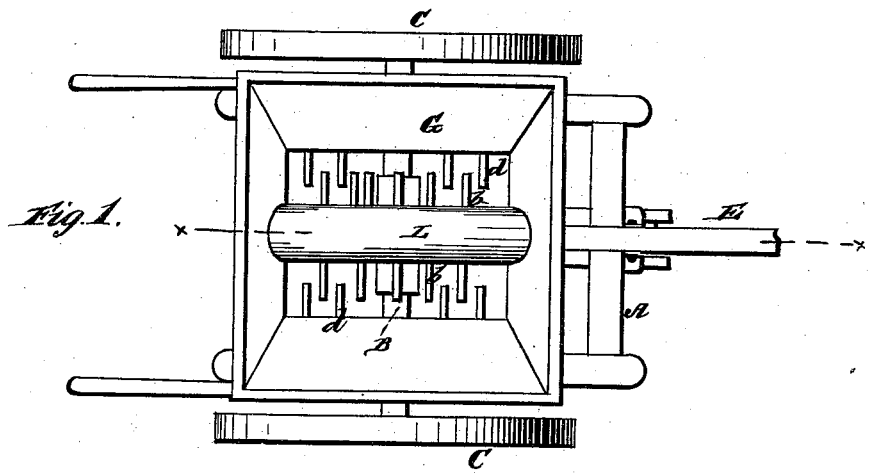
Figure 2:
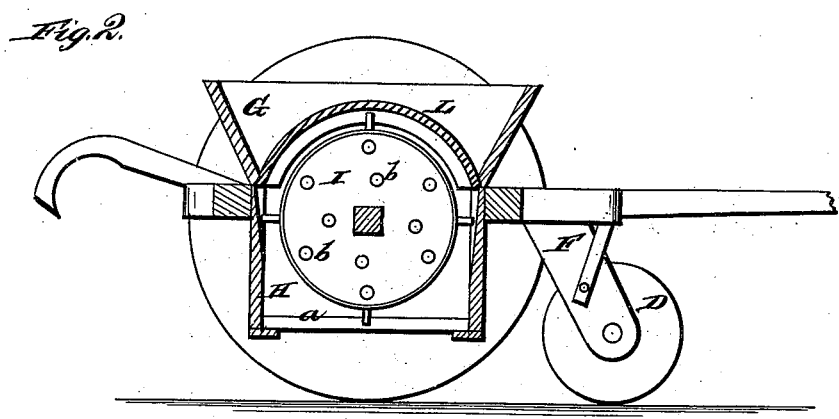

Figure 1 of the drawings is a top-plan view of my fertilizer-sower. Fig. 2 is a longitudinal central sectional view of the same through lines $x\ x$.

The nature of my invention consists in the construction and arrangement of a fertilizer-distributer, as will be hereinafter more fully set forth.

The annexed drawing, to which reference is made, fully illustrates my invention.

A represents the frame-work of my machine, provided on its under side with suitable boxes, in which the axle B is placed and rotates, said axle being on each end provided with a drive-wheel, C, which is keyed or otherwise permanently secured thereon.

E is the tongue, secured to the frame. At the front the frame is supported upon a center wheel, D, mounted in a suitable leg or standard, F, attached to the main frame.

G represents the flaring hopper, in which the fertilizer to be distributed is placed. This hopper is secured on top of the frame A, and it is extended below said frame in the shape of a vertically-sided box, H, the bottom of which is closed, with the exception of a central slot, $a$, running from front to rear.

In the center on the axle B is secured a wheel, I, which is on both sides provided with spikes or teeth $b\ b$, which are set in two or more concentric circles, as shown. These teeth work between a series of teeth, $d\ d$, projecting inward from each side of the box H. By arranging the teeth on the sides of the wheel I have found by practical tests that all choking or clogging is effectually prevented, and the fertilizer will be distributed through the opening $a$ just as fast as ground.

In the center of the hopper G is a concavo-convex semicircular bar, L, which fits over the edge of the wheel I and keeps the wheel from contact with the body of the fertilizer above it, thus preventing unnecessary friction and increase of draft.

What I claim as new, and desire to secure by Letters Patent, is—

The distributing-wheel I, having laterally-projecting teeth $b$, working between stationary teeth $d$ in the sides of the hopper H, in combination with the concavo-convex box or shield L, as and for the purposes set forth.

In testimony that I claim the above I have hereunto subscribed my name in the presence of two witnesses.

JOHN H. B. REA.

Witnesses:
T. J. SIMMONS,
SAMUEL W. McWHORTER.